United States Patent

[11] 3,563,276

| [72] | Inventors | Hanford Z. Hight, Short Hills; Stephen Lesky, Metuchen, N.J. |
|---|---|---|
| [21] | Appl. No. | 767,601 |
| [22] | Filed | Aug. 29, 1968 |
| [45] | Patented | Feb. 16, 1971 |
| [73] | Assignee | Bonded Products, Inc. |

[54] PIPE JOINT COCOON
9 Claims, 4 Drawing Figs.

[52] U.S. Cl. ................................. 138/99;
156/94; 285/21
[51] Int. Cl. .................................. F16l 55/16,
B22b 35/00; F16l 47/02
[50] Field of Search ........................... 138/99,
177, 178, 178 (Resin), 178 (Glass); 156/94;
285/21

[56] References Cited
UNITED STATES PATENTS

| 1,445,858 | 2/1923 | Tallman | 156/94 |
| 2,307,148 | 1/1943 | McGuire | 138/99 |
| 2,667,865 | 2/1954 | Herman | 285/21X |
| 2,739,829 | 3/1956 | Pedlow et al. | 285/21 |
| 2,828,800 | 4/1958 | Hopkins et al. | 285/21X |
| 2,924,546 | 2/1960 | Shaw | 156/94 |
| 2,930,634 | 3/1960 | Merritt | 285/21 |
| 3,141,478 | 7/1964 | Copeland | 138/99X |
| 3,235,289 | 2/1966 | Jones | 285/21 |
| 3,358,898 | 12/1967 | Medkeff et al. | 138/99X |
| 2,898,945 | 8/1959 | Backer | 138/99 |
| 3,432,188 | 3/1969 | Turner | 138/99X |
| 3,439,945 | 4/1969 | Chambers et al. | 138/99X |

FOREIGN PATENTS

| 624,433 | 7/1961 | Canada | 138/99 |

*Primary Examiner* — James Kee Chi
*Attorney* — Richard S. Shreve, Jr.

ABSTRACT: Upper and lower halves of cocoonlike shell of glass cloth saturated with epoxy resin surrounding the pipe joint, held in place by masking tape, ends and side seams coated with epoxy resin reinforced with crisscrossed glass tape.

INVENTORS
HANFORD Z. HIGHT
STEPHEN LESKY
BY Richard S. Shreve, Jr.
THEIR ATTORNEY

PATENTED FEB 16 1971

INVENTORS
HANFORD Z. HIGHT
STEPHEN LESKY
BY
Richard S. Shreve, Jr.
THEIR ATTORNEY

3,563,276

PIPE JOINT COCOON

BACKGROUND

The various joints used on underground pipe are subject to leakage for various reasons. A welded joint can have a pinhole, the bolt on the flange joint may loosen or the gasket deteriorate, the caulking in a bell and spigot joint may fail, or the cast iron bell may fracture, and the coupled joints may have gasket deterioration or the middle ring or body may corrode.

Repair may be by welding even though the line is in operation, flange or coupled joints by merely tightening the bolts, or a bell joint clamp may be employed, but often the failure is such that these repairs are impossible. Then the line must be shut down and the joint must be cut out and a new section put in, or a cumbersome and expensive split repair sleeve bolted in.

The split sleeve often requires boom trucks to assist in the installation. The weight of such sleeves is 4 inches/150 pounds, up to 12 inches/455 pounds, The inventive cocoon weighs 4 inches/5 pounds, up to 12 inches/25 pounds. The split sleeve is difficult to make gas tight because pulling up the gaskets is a problem, and rubber gaskets may flow or deteriorate. Also split sleeves are not available for connections of pipe of different diameters.

The invention is light in weight and low in cost, and not subject to corrosion or deterioration, and can easily be made to accommodate such different diameters.

SUMMARY

According to applicant's invention, the pipe joint is sealed by applying thereto the mating portions of a longitudinally divided cocoonlike shell of precast reinforced hardened plastic, and encasing these portions in a surrounding layer of hardenable plastic sealing material reinforced with fibrous material. The shell is preferably of glass cloth saturated with epoxy resin. The portions are preferably secured in position surrounding the joint by adhesive tape, and the ends and side seams thereof are preferably coated with a layer of hardenable plastic sealing material, preferably epoxy paste and preferably covered with glass tape painted with a liquid epoxy formulation. One of the portions is preferably vented to relieve gas pressure during installation, and the venting is capped to complete the operation. The invention includes the sealed pipe joint so constructed.

DRAWINGS

DESCRIPTION OF PREFERRED EMBODIMENT

Figure 1:
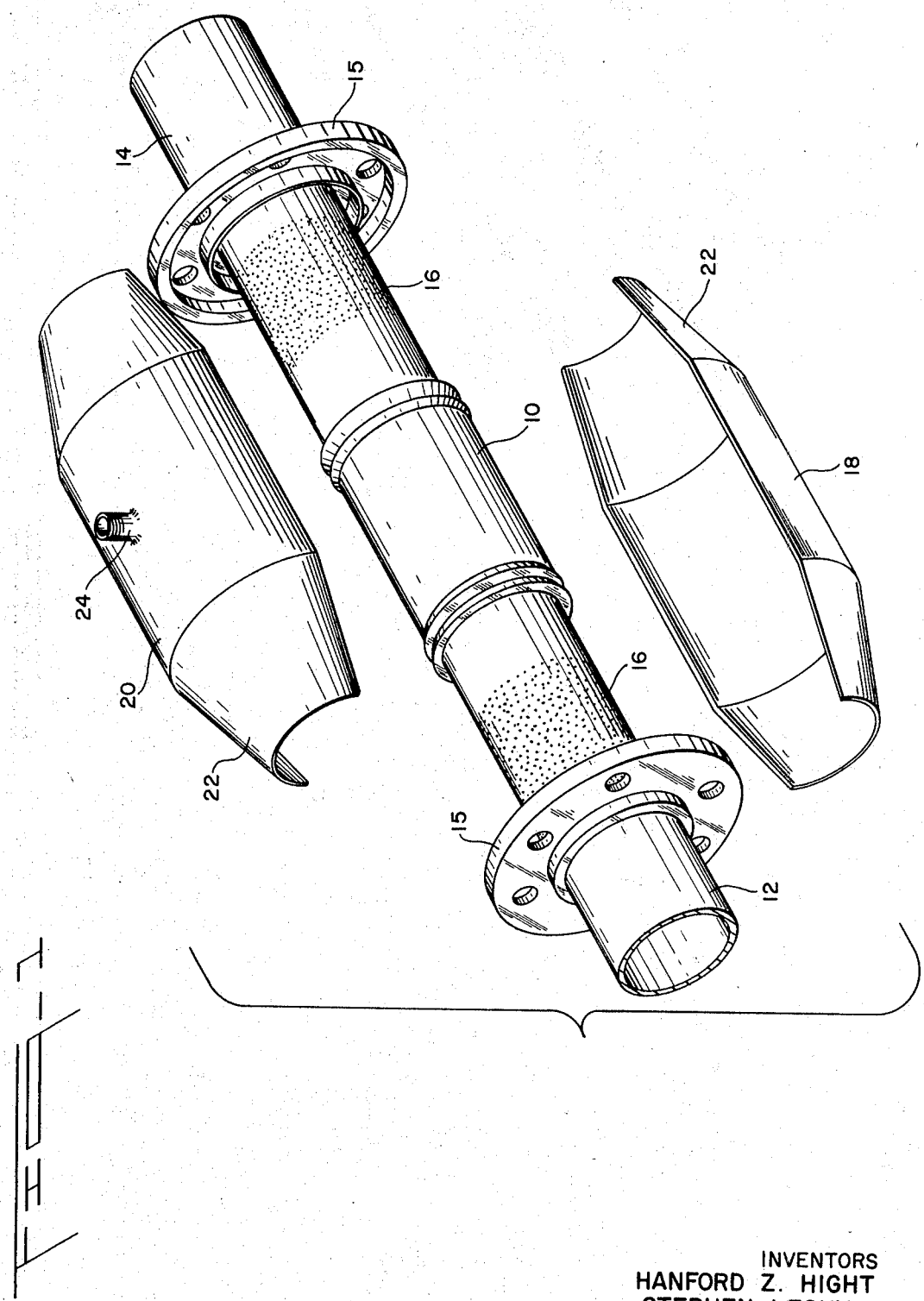
FIG. 1 is an exploded view of a pipe joint and the parts for sealing the same according to the preferred embodiment of the present invention.

FIG. 1 shows the middle ring 10 of a coupling assembled on aligned pipe ends 12 and 14. The coupling bolts have been removed and the flanges 15 backed off. The pipe ends adjacent to the coupling ring 10 are sandblasted as shown at 16 to facilitate the sealing as hereinafter described.

FIG. 1 also shows a bottom shell 18 and a complementary top shell 20 which when assembled onto the pipe joint form a cocoon of reinforced fiberglass, which is heavy glass cloth saturated with epoxy resin. The cocoon is made to a shape proper for the repair involved. In the form shown the cocoon has a cylindrical center portion with tapering portions 22 at each end. The upper shell 20 is provided with a vent in the form of a pipe nipple 24 to release pressure from a leaking joint into the atmosphere, to avoid working against this pressure during the installation of the cocoon.

Figure 2:
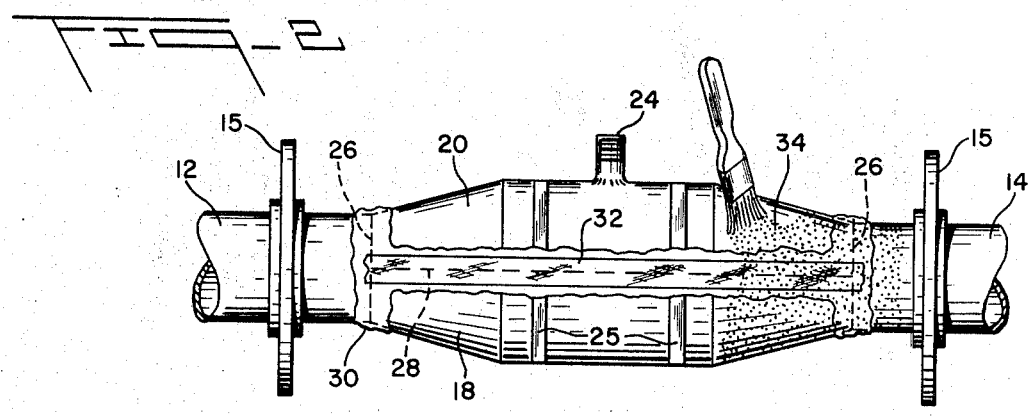
FIG. 2 is an elevation of joint, with the parts taped in place, the ends and side seams coated with epoxy paste, and the whole assembly being painted with a liquid epoxy formulation.

As shown in FIG. 2, the two halves 18 and 20 are put together over the joint and held in place with masking tape 25 or any other suitable adhesive tape. The ends 26 and the side seam 28 are coated with a heavy application of epoxy resin paste 30, to obtain a quick seal so that all of the escaping gas goes out through the vent 24, and to provide a good base material for the later application.

Figure 3:
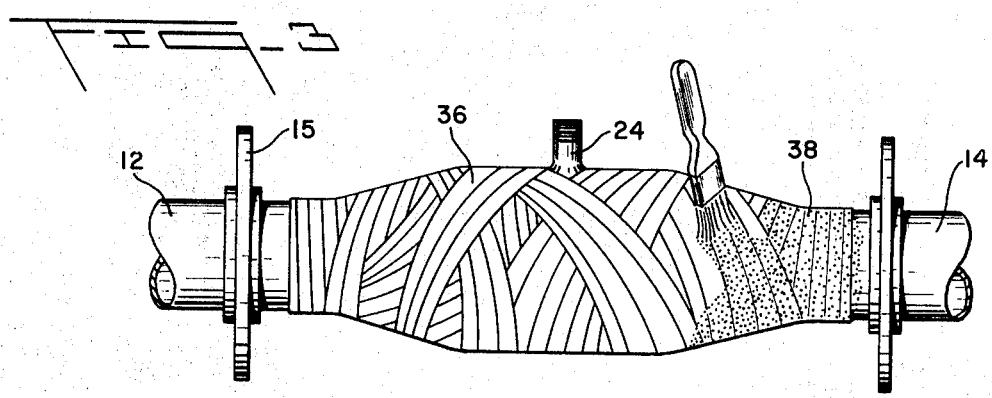
FIG. 3 is an elevation of the joint shown in FIG. 2, further wrapped with glass tape crisscrossed to cover the entire joint.
Figure 4:
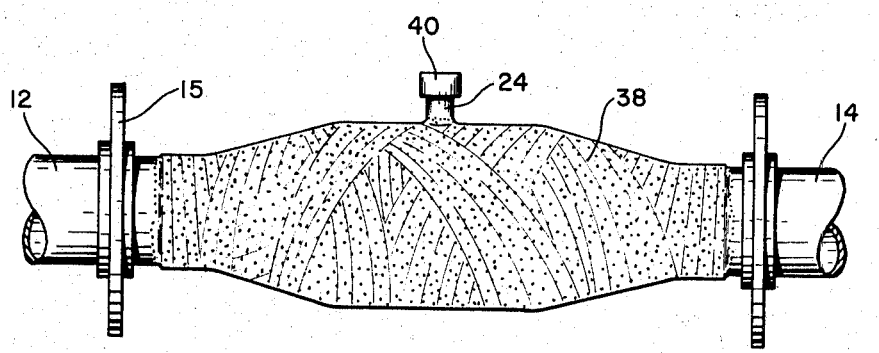
FIG. 4 is an elevation of the completed joint with the vent capped.

The side seam 28 is a relatively weak point, and hence over the paste 30 is applied a glass tape 32. The whole assembly is then painted with a liquid epoxy formulation 34. Preferably before the liquid epoxy has cured, the cocoon is wrapped with glass tape 36 as shown in FIG. 3. First the ends are wrapped well where the cocoon fairs down to the pipe diameter. Several passes are made here to bond the cocoon permanently to the pipe. Then the tape is crisscrossed to the other end and a like wrapping is made there. The tape is crisscrossed back and forth over the cocoon, which gives the necessary strength to hold it permanently in place as well as seal it.

Preferably when the tape appears dry, in that none of the previously applied liquid resin is squeezing through the tape, another serving 38 of epoxy resin is painted over the whole device. After the epoxy resin has cured, the vent 24 is closed by a cap 40 and the repair is thereby completed.

We claim:

1. Method of sealing a pipe joint, which comprises:
   applying to the joint the mating portions of a longitudinally divided cocoonlike shell of precast reinforced hardened plastic having conical ends faired own toward the pipe diameter;
   securing said portions in position surrounding the joint, and
   encasing said portions in a surrounding layer by coating said conical ends and side seams of said secured portions with a layer of hardenable plastic sealing material reinforced with fibrous material.

2. Method as claimed in claim 1, in which said portions are secured in position by adhesive tape.

3. Method as claimed in claim 1, in which said coating is by application of epoxy paste, and by covering the epoxy paste with glass tape.

4. Method as claimed in claim 3, in which the glass tape is painted with a liquid epoxy formulation.

5. Sealed pipe joint comprising mating portions of a longitudinally divided cocoonlike shell of precast reinforced hardened plastic having:
   conical ends faired down toward pipe diameter and secured in position surrounding said joint; and
   a casing surrounding said portions formed by said conical ends and side seams of said secured portions being coated with a layer of hardenable plastic sealing material reinforced with fibrous material.

6. Sealed pipe joint as claimed in claim 5 in which said precast reinforced hardened plastic shell is glass cloth saturated with epoxy resin.

7. Sealed pip joint as claimed in claim 5 in which said casing is epoxy resin reinforced with glass tape.

8. Method of sealing a joint of pipe ends in abutting relation, which comprises:
   applying to the joint a longitudinally divided cocoonlike mass of reinforced hardened plastic comprising mating shells having conical ends faired down toward the pipe diameter;
   by moving said shells toward each other with said abutting ends therebetween until said shells contact each other thereabout to surround the same;
   thereafter securing said mating shells together by coating said conical ends and side seams with a layer of hardenable sealing material; and
   by wrapping said coated conical ends and side seams with nonmetallic tape in several passes and crisscrossed back and forth..

9. Sealed joint of pipe ends in abutting relation, comprising:

mating shells of a longitudinally divided cocoonlike mass of precast reinforced hardened plastic having conical ends faired down toward the pipe diameter;

said shells being brought together radially with said abutting ends therebetween to contact each other thereabout to surround the same;

said mating shells being secured together by said conical ends and side seams having a coating of a layer of hardenable sealing material; and by said coated conical ends and side seams being wrapped with nonmetallic tape in several passes and crisscrossed back and forth.